US005245357A

United States Patent [19]

Maruyama et al.

[11] Patent Number: 5,245,357

[45] Date of Patent: Sep. 14, 1993

[54] PAGE PRINTER

[75] Inventors: Mitsuaki Maruyama; Hiroshi Hiki; Shigeru Sawada; Seiji Mochizuki; Yasuhiro Gyoutoku, all of Nagano, Japan

[73] Assignee: Seiko Epson Corporation, Tokyo, Japan

[21] Appl. No.: 887,585

[22] Filed: May 20, 1992

Related U.S. Application Data

[63] Continuation of Ser. No. 547,306, Jul. 3, 1990, abandoned, which is a continuation of Ser. No. 403,309, Sep. 6, 1989, Pat. No. 4,945,364.

[30] Foreign Application Priority Data

Sep. 7, 1988 [JP] Japan ............................... 63-224076

Sep. 7, 1988 [JP] Japan ............................... 63-224077

[51] Int. Cl.[5] ...................... G01D 15/24; G03G 15/00

[52] U.S. Cl. .................................... 346/134; 355/200; 355/211

[58] Field of Search .......................................... 312/333

[56] References Cited

U.S. PATENT DOCUMENTS

| | | | |
|---|---|---|---|
| 2,355,839 | 8/1944 | Albert | 312/333 |
| 4,540,268 | 9/1985 | Toyono et al. | 355/210 |
| 4,754,293 | 6/1988 | Aizawa et al. | 355/309 |
| 4,757,342 | 7/1988 | Ogura et al. | 355/211 |
| 4,785,319 | 11/1988 | Fujimo et al. | 346/160 |
| 4,941,002 | 7/1990 | Maruyama et al. | 346/160 |
| 4,945,364 | 7/1990 | Maruyama et al. | 346/160 |

FOREIGN PATENT DOCUMENTS 0357041 8/1989 European Pat. Off. .

*Primary Examiner*—Benjamin R. Fuller

*Assistant Examiner*—David Yockey

*Attorney, Agent, or Firm*—Cushman, Darby & Cushman

[57] ABSTRACT

A page printer having a housing body and including a gate roller, a developing unit, a photosensitive drum unit, a fixing unit and a sheet discharging roller arranged on the front side of the housing body in the order stated from above so that the printing sheet conveying path is substantially vertical to reduce floor area required for installation. An optical writing unit is provided on the rear side of the housing body. Guide members are provided on the housing body to readily mount or demount the photo-sensitive drum unit. Further, a shield board is disposed between the photo-sensitive drum unit and the fixing unit so that the printing sheet will not be stained by toner scattering from the photosensitive drum.

4 Claims, 7 Drawing Sheets

PAGE PRINTER

This is a continuation of application Ser. No. 07/547,306, filed on Jul. 3, 1990 now abandoned, which was a continuation of U.S. Ser. No. 403,309 filed Sep. 6, 1989 U.S. Pat. No. 4,945,364.

BACKGROUND OF THE INVENTION

1. Field of the Invention

This invention relates to a page printer in which a light beam controlled with a data signal is applied to a photo-sensitive material to record characters, patterns, etc. on a recording sheet in accordance with the principles of electrophotography.

2. Description of the Related Art

A page printer based on the principle of "xerography" has been developed in order to improve the print quality and printer speed. In that page printer, a light beam controlled with printing data is applied to a photo-sensitive material to form a latent image thereon. The latent image is developed with coloring toner and fixed on a printing sheet.

The page printer of the type described above is shown in FIG. 9 and includes a horizontal housing M made up of two members N and Q so that the member Q is swung upwardly to open the housing. An optical writing unit is built in the member Q, while a photosensitive drum, a developing unit, etc. are in the member N. A sheet conveying path is provided from one side of the housing to the other side, so as to supply a printing sheet from a sheet cassette R provided on the one side of the housing. Thus, the page printer is of the "clamshell" type.

The above-described page printer has a number of deficiencies. For example, since the light beam generating unit and the photo-sensitive drum are positioned relative to one another by means of a hinge mechanism S of the housing M, the positioning of the light beam generating unit and the photo-sensitive drum may be inaccurate. In addition, in order to provide a sheet storage section and a printing route section, the device occupies a floor area at least two times the area of a printing sheet.

In order to overcome the above-described drawbacks, the present application proposed a page printer in Japanese Patent Application (UPA) No. 234167/1987 (the term "UPS" as used herein means an "Unexamined Published Application "). In that page printer, the sheet conveying path is substantially vertical, and the light beam generating unit is substantially vertical, and the light beam generating unit and the photo-sensitive drum are provided on the base side.

The page printer thus proposed is advantageous in that the floor area required for installation is decreased, and the positioning of the light beam generating unit and the photo-sensitive drum relative to each other is more accurate. However, it is still disadvantageous in that the maintenance is rather troublesome because the photo-sensitive drum must be mounted or demounted from the side. Furthermore, since a variety of units are arranged vertically, toner scattering from the photo-sensitive drum may stick onto the other units, thus staining the printing sheet.

SUMMARY OF THE INVENTION

In view of the foregoing, one object of this invention is to provide a page printer in which the installation floor area is reduced, the light beam generating unit and the photo-sensitive drum can be accurately positioned relative to each other, and the photo-sensitive drum can be readily mounted and demounted.

Another object of the invention is to provide a page printer in which the installation floor area is reduced, the light beam generating unit and the photo-sensitive drum can be accurately positioned relative to each other, and the printing sheet is substantially prevented from being stained.

The foregoing objects and other objects of the invention have been achieved by providing a page printer including a housing having a housing body and a cover swingably coupled to the lower end of the housing body, a gate roller, a developing unit, a photo-sensitive drum unit, a fixing unit and a sheet discharging roller which are arranged on the front side of the housing body in the order stated from above; an optical writing unit provided on the rear side of the housing body; and guide means provided on the housing body, for guiding the photo-sensitive drum unit obliquely downwardly to the rear side of the housing body. Further, the page printer of the invention, a shield board is arranged between the photo-sensitive drum unit and the fixing unit.

As was described above, in the page printer of the invention, the developing unit, the photo-sensitive drum unit and the fixing unit are arranged on the front side of the housing body in the order stated from above. Therefore, the printing sheet conveying path is substantially vertical, which reduces the floor area required for installing the page printer. Furthermore, the units concerning the printing sheet are positioned in the front side of the housing body, while the members handling printing sheet in cooperation with these units are provided on the cover. Therefore, the printing sheet conveying path can be readily exposed by opening the cover. Furthermore, with the cover opened, the photo-sensitive drum unit can be readily mounted or demounted by moving it along the guide members with the cover opened.

In addition, the photo-sensitive drum and the optical writing unit, which should be precisely positioned, are maintained in proper position because they are disposed in the housing body. Even further, the shield board provided between the photo-sensitive drum and the fixing unit blocks the toner scattering from the photo-sensitive drum, thereby preventing toner from entering the units located below the photo-sensitive drum. As a result, the printing sheet will not be stained by toner which scatters from the photo-sensitive drum.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
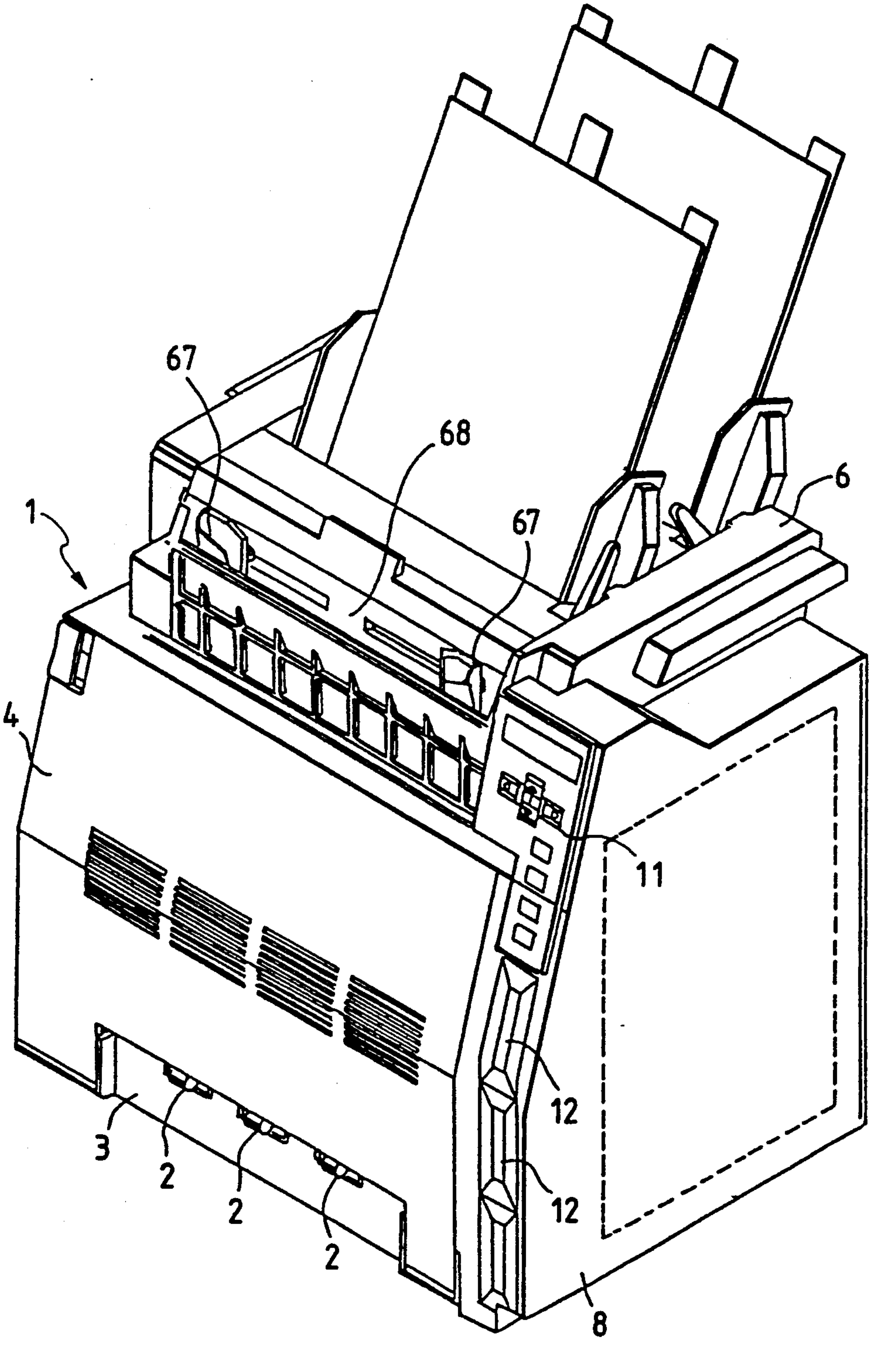
FIG. 1 is a perspective view showing one example of a page printer with a cut sheet feeder according to this invention.

Preferred embodiments of this invention will be described with reference to the accompanying drawings.

FIGS. 1, 2, 3, and 4 are perspective views and sectional views showing one example of a page printer according to the invention. In these figures, reference numeral 1 designates a housing body accommodating a printing mechanism. A sheet discharge outlet 3 for discharging a printing sheet conveyed by sheet discharge rollers 2 is formed on the lower portion of the front side of the housing body 1. A cover 4 is hinged to the housing 1 so that it lies across the sheet discharge outlet. Side boards 5 supporting various units are provided inside the housing, on both sides thereof. A cut sheet feeder 6 is provided above the housing so that it is movable by means of guide mechanisms 7. A compartment 9 is provided on one side of the housing body 1, on the right of the right side board 5 in FIG. 2. The compartment 9 is closed with a cover 8, and accommodates a control circuit board and an external memory medium reading unit. A control panel 11 and external memory medium inlets 12 are provided on the front side of the compartment 9.

A sheet guide board 15 which communicates with an upwardly open sheet receiving member 14 is provided on the front side of the housing body 1. In addition, gate rollers 17 are provided, and a photo-sensitive drum unit 18 is arranged below the gate rollers 17. A fixing unit 44 is disposed below the photo-sensitive drum unit 18 and a partition board 43 is disposed therebetween, as described more fully below.

Figure 6:
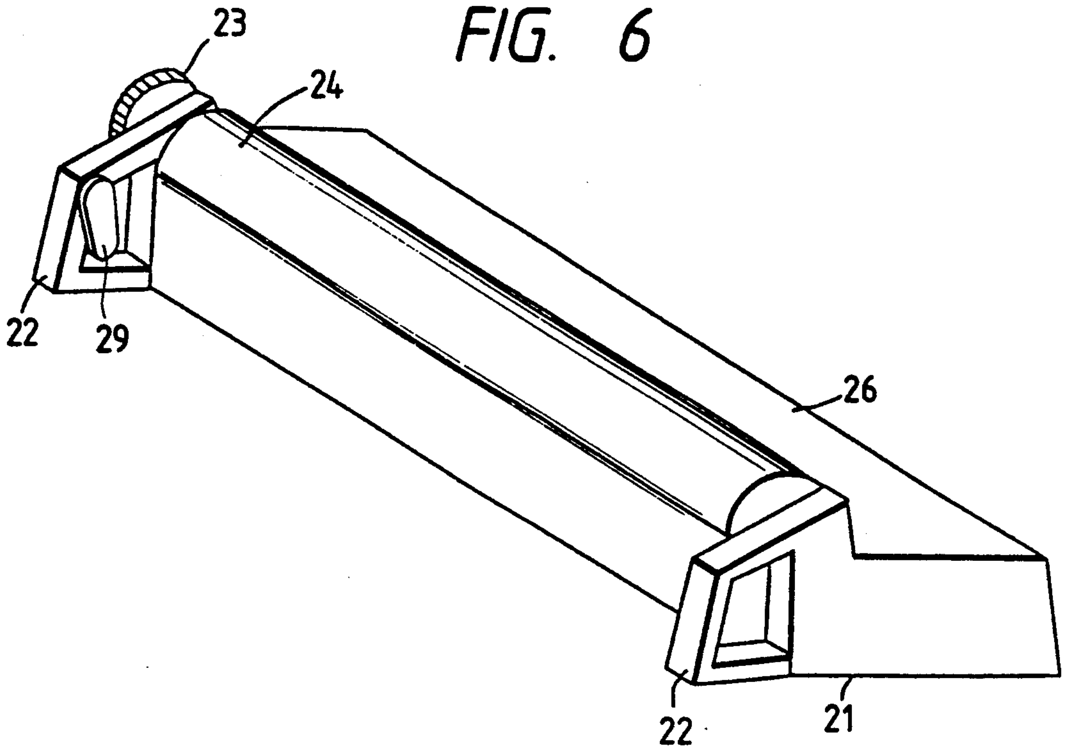
FIG. 6 is a perspective view showing one example of a photo-sensitive drum unit in the page printer according to the invention.
Figure 7:
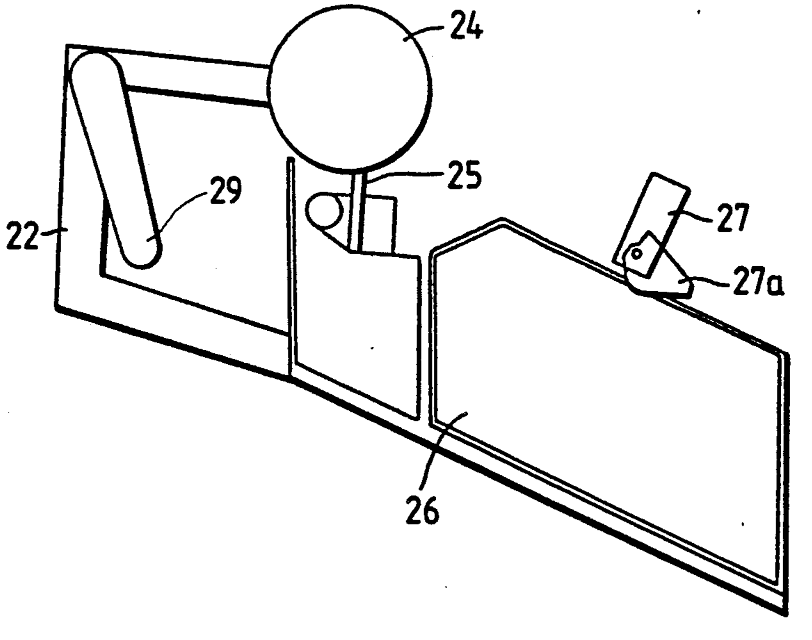
FIG. 7 is a sectional view showing one example of a photo-sensitive drum unit in the page printer according to the invention.
Figure 8:
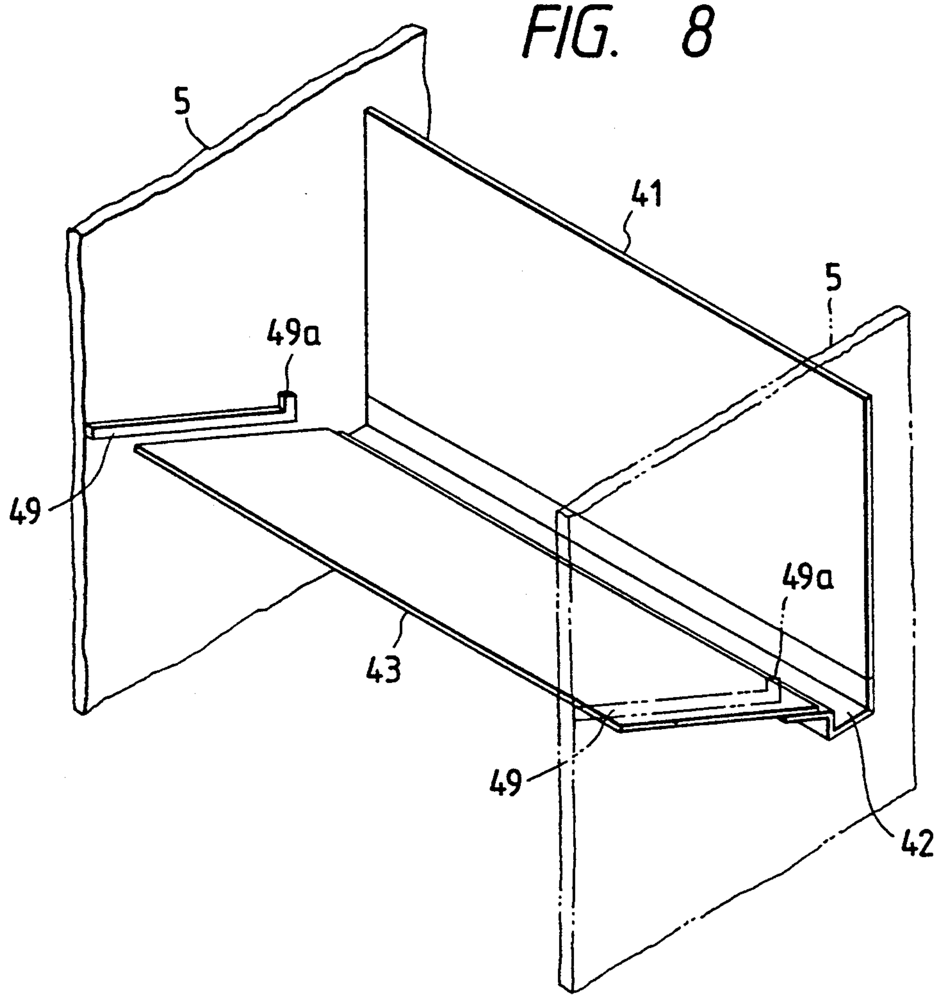
FIG. 8 is a perspective view showing one example of guide members provided for the photo-sensitive drum unit according to the invention.
Figure 9:
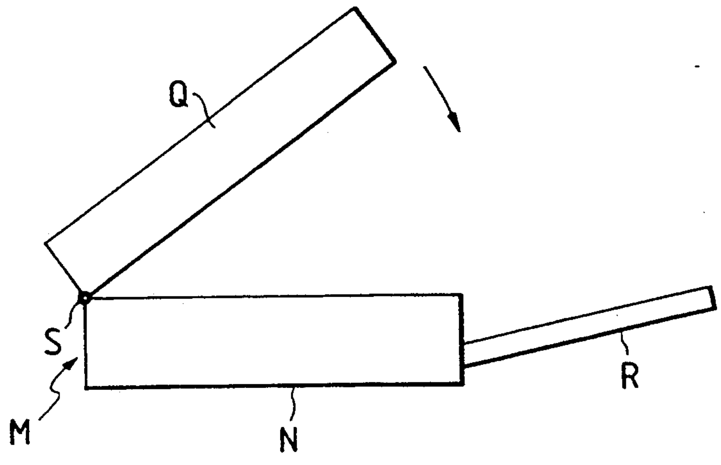
FIG. 9 (Prior Art)
FIG. 9 is an explanatory diagram for describing the arrangement of a conventional page printer.

FIGS. 6 and 7 show one example of the above-described photo-sensitive drum unit 18. In these figures, reference numeral 21 designates bases which have handles 22 at the front ends, and are supported and guided by the guide members 49 which are provided on the side boards 5 of the housing body 1, as shown in FIG. 8. Guide members 49 are inclined downwardly from the front side of the housing body towards the rear side. A photo-sensitive drum 24 is rotatably mounted on the bases so that it is engaged with a drive mechanism in the printer body, for example via gear 23. A blade 25 and a waste toner tank 26 for receiving toner from the blade 25 are provided below the photo-sensitive drum 24. The blade 25 is brought into contact with the surface of the photo-sensitive drum. The drum 24, the blade 25, and the tank 26 form one unit. Further in FIGS. 6 and 7, reference numeral 27 designates a waste toner detector with a detecting lever 27*a* which is raised when the tank 26 is filled with waste toner. Reference numeral 29 designates a level which drives a pawl member (not shown in particular) to lock the photo-sensitive drum unit to the housing body 1.

Figure 5:
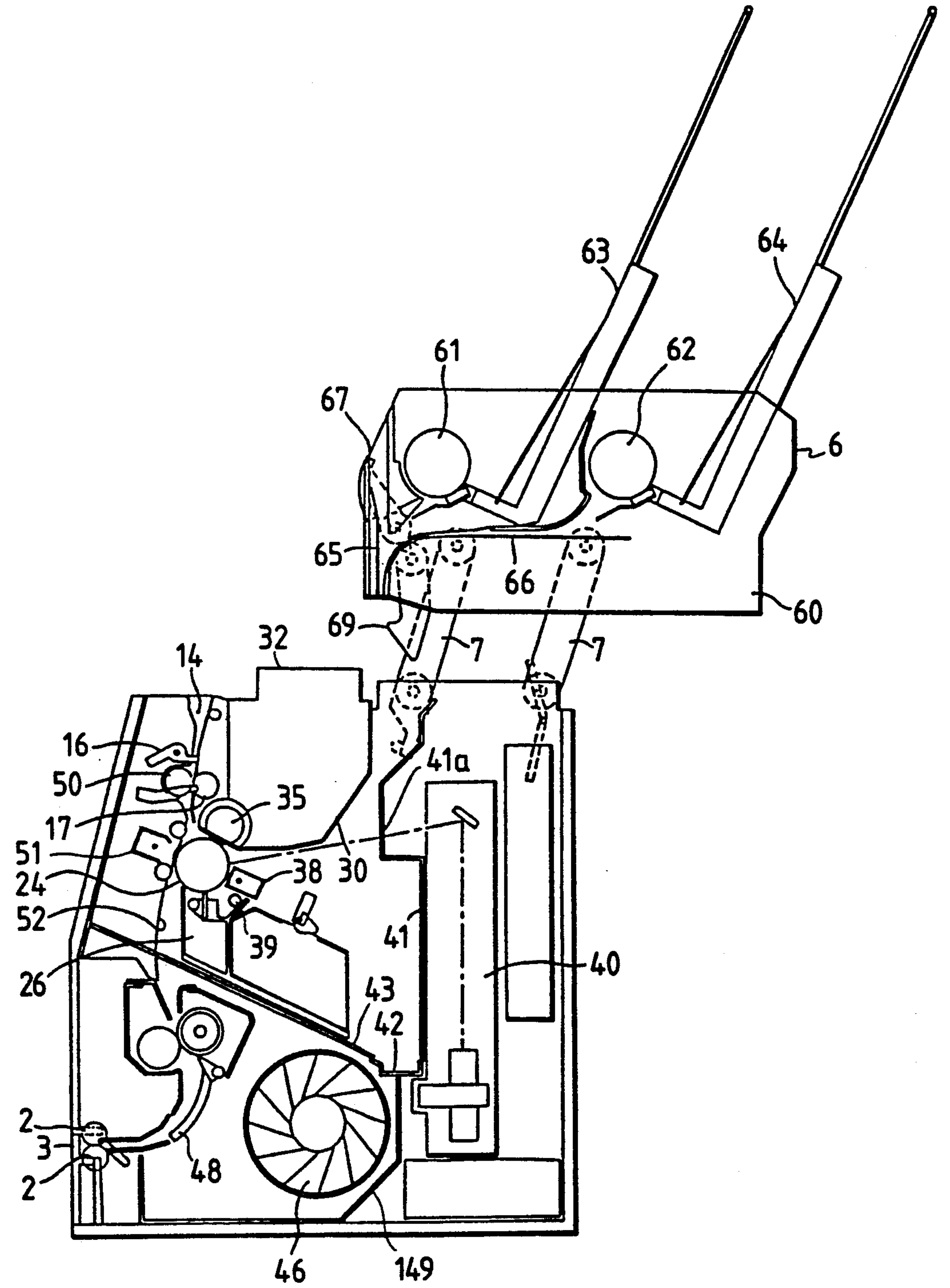
FIG. 5 is a sectional view of the page printer with the cut sheet feeder retracted.

Referring back to FIGS. 1 through 4, a developing unit 30 is provided behind the sheet guide board 15 so that, when the cut sheet feeder is retracted (as shown in FIG. 5), a toner supplying inlet shutter 32 is exposed.

The magnetic brush provided on the surface of the magnetic sleeve 35 of the developing unit 30 is in contact with the photo-sensitive drum 24. A charging unit 38 is provided for the photo-sensitive drum 24 so that it is spaced from the bottom of the container 31 of the developing unit 30 circumferentially of the drum. A discharging unit 39 is disposed around the drum so that it is spaced from the charging unit in the direction of rotation of the drum.

Reference number 40 designates an optical writing unit which is provided in the space which is defined by a front partition wall 41 and a second partition wall 149, described more fully below. The output light beam of the optical writing unit 40 is applied through a window 41*a* formed in the partition wall 41 and through the gap between the developing unit 30 and the charging unit 38 to the surface of the photo-sensitive drum 24.

A shield board 43 is provided below the photo-sensitive drum unit 18 so that, as shown in FIG. 8, it is slanted backwardly and downwardly, is integral with the partition wall 41, and is sealingly secured to the side boards 5. A groove 42 for receiving waste toner is provided at the joint of the shield board 43 and the partition wall 41. The second partition wall 149 is provided below the groove 42, thus dividing the housing body into front and rear spaces. The front space is further divided by the shield board 43 into upper and lower spaces. The fixing unit 44 comprises a heating roller 45, a pressure roller 47, and an exhaust fan 46 in the lower space. The heating roller 45 and the pressure roller 47 are so positioned that the straight line L connecting the central axes of these rollers 45 and 47 is substantially perpendicular to the front end of a sheet which is moved along a guide member 48. The guide member 48 is provided on the sheet discharge side of the fixing unit 44, so that a vertically moving printing sheet is delivered to the sheet discharge outlet 3 through the sheet discharge rollers 2.

A sheet detecting lever 16 for operating a sheet detector (not shown), pinch rollers 50, and a transferring unit 51 are provided on the inner surface of the cover 4 in the order stated from above, so that the pinch rollers 50 are abutted against the gate rollers 17, and the transferring unit 51 confronts with the photo-sensitive drum 24 downstream of the magnetic sleeve 35. A guide member 52 is arranged in the sheet conveying path from the photo-sensitive drum 24 to the fixing unit 44. The guide member 52 comprises a plurality of ribs 52*a*, each concave at the center, which are arranged in the direction of width of the printing sheet. Therefore, a printing sheet which has passed through the photo-sensitive drum 24 is convexly curved toward the cover 4.

The cut sheet feeder 6 is provided above the housing body 1 by means of guide or link mechanisms 7, and has a frame 60 which can be set at two positions, a sheet feed position (FIG. 3) and a retract position (FIG. 5). A front sheet feed roller 61 and a rear sheet feed roller 62 are mounted on the frame 60 so that they are in parallel to each other. Sheet hoppers 63 and 64 are held substantially vertically so as to cause the lower end portion of a printing sheet to elastically abut against the sheet feed rollers 61 and 662. Guide members 65 and 66 extend below the sheet feed rollers 61 and 62 to the sheet receiving inlet 14 on the body side. Guide members 67 are provided substantially above the sheet receiving inlet 14 and at the front end portion of the frame 60 as so to form a manual sheet inserting inlet 68. Further, a lock member 69 for securing the frame 60 to the housing body 1 is provided as shown in FIG. 5.

When, in the page printer thus constructed, a printing sheet size is selected, the one of the sheet feed rollers 61 and 62 which corresponds to that size, for instance, the roller 62 is turned to take one printing sheet from the sheet hopper 64 deliver it to the body 1 via the guide 66. Upon arrival to the upper surface of the housing body 1, the sheet goes into the upwardly open sheet receiving inlet 14. Then the sheet, being guided by the guide board 15, is moved downwardly in the housing body 1 to abut against the gate rollers 17. At this point the sheet pushes the sheet detecting lever 16. As a result, the sheet detector outputs a detection signal, and the gate rollers 17 are turned to convey the sheet downwardly with a sheet reference position determined.

Data to be printed is applied to the control circuit board to control the light beam generating unit 40, so that a latent image is formed on the photo-sensitive drum 24 in accordance with the data. The latent image is developed by applying toner thereto with the developing sleeve 35 as the photo-sensitive drum 24 rotates. Further, as the photo-sensitive drum 24 is turned, the developed image is moved into confronting relation to the transferring unit 51, and is transferred onto the printing sheet.

As the printing sheet exits the transferring unit 51, it is guided with its front edge being brought into contact with the curved guide member 52 of the cover 4. As the print region increases, the printing sheet is further moved downwardly with its back along the guide member 52. Thus, the printing sheet goes into the fixing unit 44 while being maintained curved by the guide member 52. The toner on the printing sheet is then fixed in the fixing unit 44. As is apparent from the foregoing, the printing sheet is delivered to the fixing unit 44 with its non-fixed toner surface concavely curved and, hence, spaced from the housing body. Thus, the toner surface is not scratched by the housing body, and is stably fixed by the fixing unit. After the printing sheet passes through the fixing unit 44, it is guided by the sheet guide member 48, so that it is discharged through the sheet discharge outlet 3 by the sheet discharge rollers 2 with its print surface side facing down.

The heat generated by the fixing unit and the moisture which evaporates from the printing sheet during fixing are prevented from entering the photo-sensitive drum 24 and the optical writing unit 40 by the shield board 43 and the second partition wall 149, and are quickly discharged by the fan 46.

The toner which is not transferred onto the printing sheet from the photo-sensitive drum 24, that is the toner remaining on the photo-sensitive drum 24, is scraped off by the blade 25 which is provided substantially below the photo-sensitive drum 24. That toner drops by its own weight into the waste toner tank 26 located just below the photo-sensitive drum 24. The toner scattered from the waste toner tank 26 is blocked by the shield board 43 and thus is prevented from entering the lower units. The waste toner is also prevented from entering the optical writing unit 40 by the partition walls 41 and 149.

The toner may leak out during the printing operation. However, the scattering of such toner is substantially prevented by side boards 5, the partition wall 41, and the shield board 43 and it is accumulated in a groove 42.

If a printing sheet is caught or jammed during the printing operation, the printing sheet can be easily taken out by opening the cover 4. More particularly, by opening cover 4, the sheet retaining members such as the pinch rollers 50, the transferring unit 51 and the sheet guide members 52 are disengaged from the housing body 1, so that the sheet conveying path is exposed. Therefore, a sheet caught in the sheet conveying path can be easily removed.

After the jammed sheet has been removed, the cover 4 is lightly pushed back to close the housing body 1, so that the printer operation can be started. When the cover 4 is opened and closed as described above, the optical writing unit 40 and the photo-sensitive drum 24 remain in the housing body 1. Therefore, the optical writing unit 40 and the photo-sensitive drum 24 are never displaced.

Figure 2:
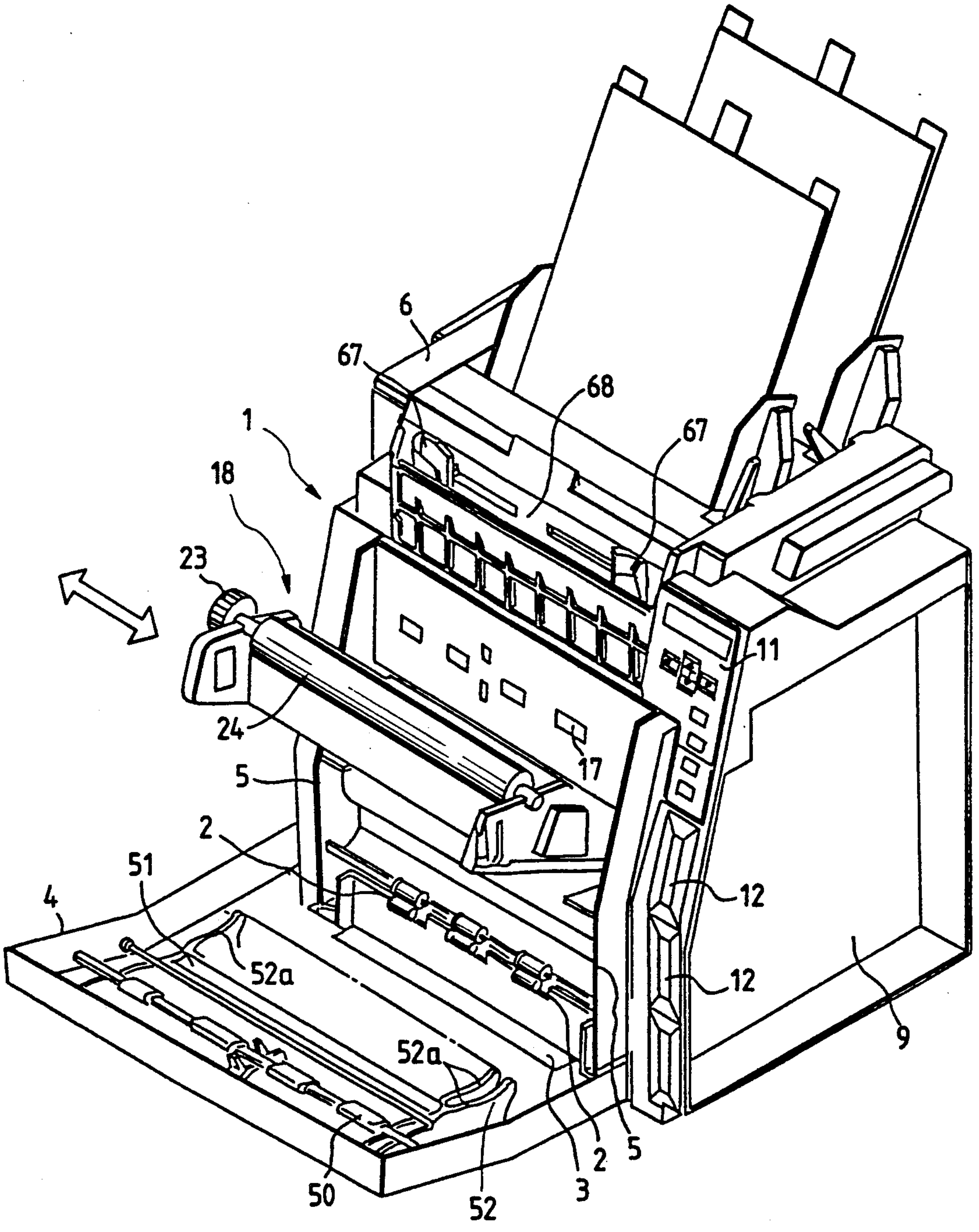
FIG. 2 is a perspective view showing the page printer with its cover opened and with its photo-sensitive drum unit pulled out.
Figure 3:
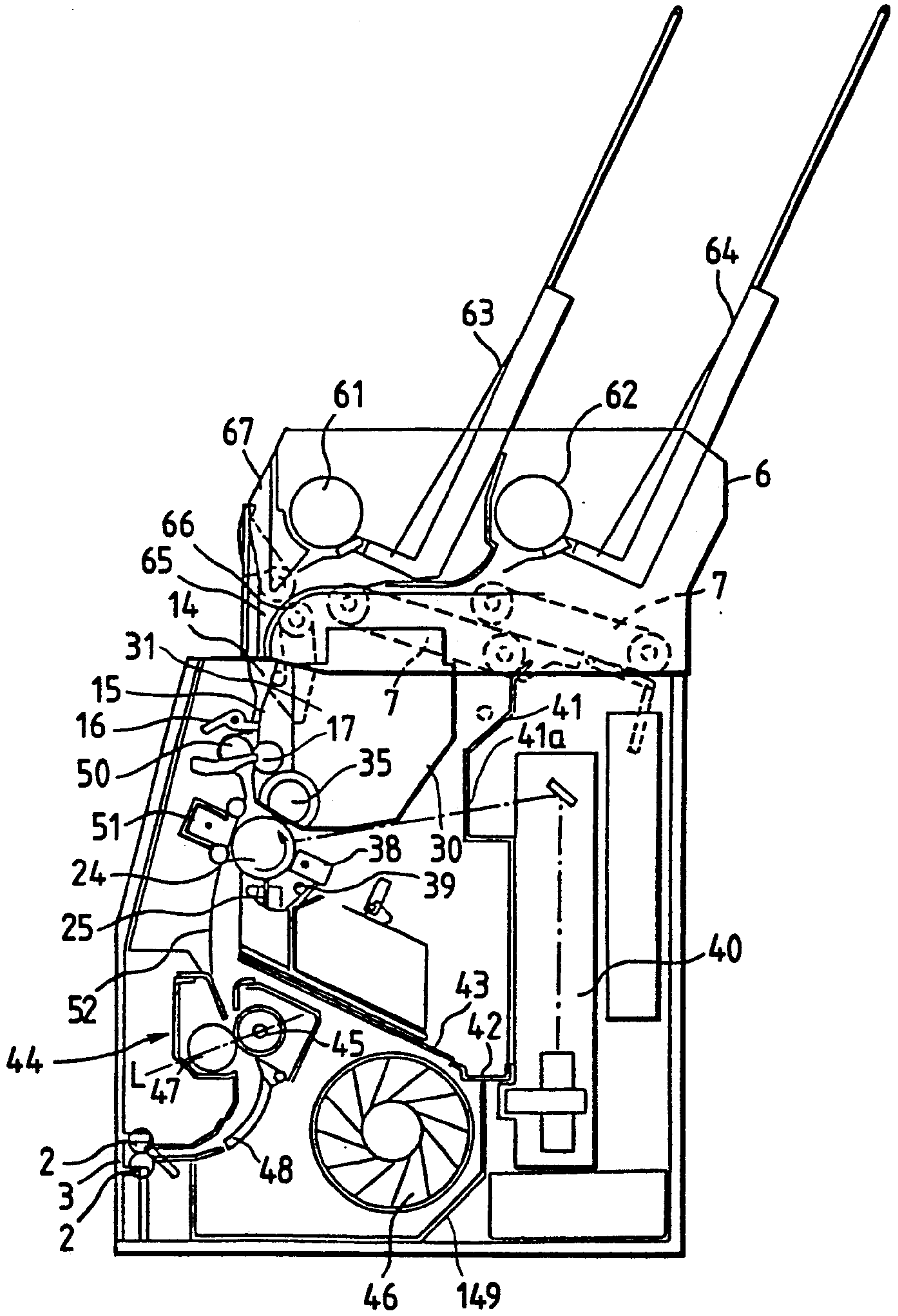
FIG. 3 is a sectional view of the page printer ready for a printing operation.
Figure 4:
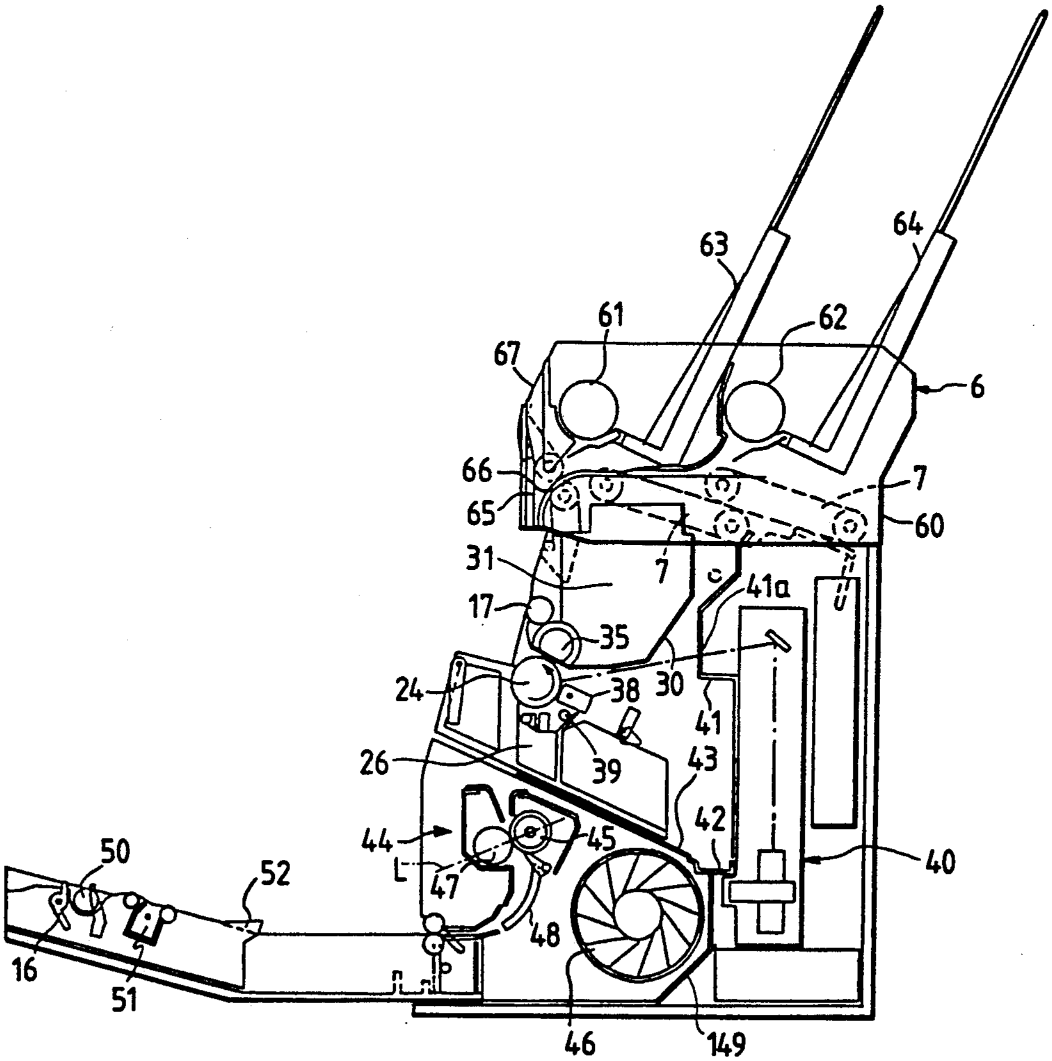
FIG. 4 is a sectional view of the page printer with the cover opened.

When it is required to replace the photo-sensitive drum 24 or to take out the waste toner, the cover is opened. The handles 22 on both sides of the photo-sensitive drum unit are then pulled forward, so that the base 21 slides obliquely upwardly along the guide members 49 on the side boards 5. Thus, the operator can take out the photo-sensitive drum unit in one motion while watching it (FIG. 2).

After the photo-sensitive drum unit has been pulled out in this manner, the photo-sensitive drum may be replaced with a new one, or the waster toner may be removed. Thereafter, the base 21 is engaged with the guide members 49 by using the handles 22, and the photo-sensitive drum unit 18 is pushed back. As a result, the unit 18, being guided by the guide members 49, is moved obliquely downwardly to abut against the stoppers 49*a* and is thus in place. Since the guide members extend obliquely downwardly to the rear side of the housing body, the photo-sensitive drum unit 18 will not be displaced forwardly even if jolted.

It may be required to use printing sheets other than those set in the hoppers. In this case, the guide members 67 are so positioned as to be spaced from each other to accommodate the width of the printing sheets to be used. A printing sheet is then vertically inserted into the manual sheet inserting inlet 68. The sheet thus inserted goes into the sheet receiving inlet 14 to activate the sheet detecting lever 16 and the printing operation is carried out as described above.

In the above-described embodiment, the guide members for the photo-sensitive drum unit are provided on the side boards. However, the shield board 43 may be modified as to guide the photo-sensitive drum unit.

In the above-described embodiment, some components of the photo-sensitive drum unit are replacable. It is to be understood, however, that the entire photo-sensitive drum unit can be replaced with a new one.

Furthermore, in the above-described embodiment, the shield board and the partition walls are separate components. However, these components may be formed as one unit by press molding or by injection molding.

As was described above, in the page printer of the invention, the gate rollers, the developing unit, the photo-sensitive drum unit, the fixing unit and the sheet discharge rollers are arranged on the front side of the housing body in the order stated from above and the cover is pivotally coupled to the lower end. Further, the optical writing unit is provided on the rear side of the housing body and guide members are provided on the housing body to guide the photo-sensitive drum unit obliquely downwardly to the rear. With the gate rollers, the developing unit, the photo-sensitive drum unit, the fixing unit and the sheet discharge rollers arranged as described above, the sheet conveying path is formed substantially vertically, which minimizes the floor area required for installation of the page printer. Furthermore, the photo-sensitive drum unit is movable along the guide members. Thus, the photo-sensitive drum unit can be slid obliquely with the front side of the housing opened. This simplifies maintenance of the page printer.

With the page printer configuration of the invention, the toner scattered from the photo-sensitive drum unit is blocked by the shield board so that it is prevented from entering the units positioned below it. Thus, the printing sheet is prevented from being stained by the scattered toner. Furthermore, the shield board substantially eliminates the problem of air heated by the fixing unit and the water vapor evaporating from the printing sheet during fixing entering the photo-sensitive drum and thereby deteriorating the same.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A page printer comprising:

a housing including a housing body having first and second sidewalls and a cover pivotally coupled to a lower end of said housing body;

a gate roller, a photo-sensitive unit, a fixing unit, a transfer unit and a sheet discharge roller, each arranged on one of said housing body and said cover, said photo-sensitive unit having sidewalls and a bottom wall and being selectively mounted within said housing body so that said sidewalls thereof are parallel to said first and second sidewalls of said housing body and so that said bottom wall is inclined with respect to horizontal;

an optical writing unit provided on a rear side of said housing body; and guide means projecting from each of said sidewalls of said housing body for engaging said bottom wall of said photo-sensitive unit to guide said photo-sensitive unit obliquely downwardly toward the rear side of the said housing body.

2. A page printer as in claim 1, wherein said photo-sensitive unit comprises a base having at least one handle on a front end portion thereof, a photo-sensitive unit mounted on the front end portion of said base, and a waste toner tank provided on a rear end portion of said base.

3. A page printer as in claim 1, wherein said photo-sensitive unit comprises a base having at least one handle on a front end portion thereof, a photo-sensitive unit mounted on the front end portion of said base, a waste toner tank provided on a rear end portion of said base, and a blade disposed below said photo-sensitive unit when said photo-sensitive unit is mounted on said housing body.

4. A page printer comprising:

a housing including a housing body having an opened portion and first and second sidewalls and a cover pivotally coupled to a lower end of said housing body;

a gate roller, a photo-sensitive unit, a fixing unit, a sheet discharge roller and a transfer unit arranged on any one of said housing body and said cover, respectively, said photosensitive unit having sidewalls and a bottom wall and being selectively mounted within said housing body so that said sidewalls thereof are parallel to said first and second sidewalls of said housing body and so that said bottom wall is inclined with respect to horizontal;

an optical writing unit arranged to said housing at the side opposite to said cover with respect to said photosensitive unit; and guide means for guiding said photo-sensitive unit, said guide means projecting from each of said sidewalls of said housing body for engaging said bottom wall of said photo-sensitive unit to guide said photo-sensitive unit obliquely downwardly toward said optical writing unit from the opened portion of said housing body.

* * * * *